United States Patent
Donner et al.

(10) Patent No.: US 6,625,329 B1
(45) Date of Patent: Sep. 23, 2003

(54) METHOD FOR IMPROVING THE DEFINITION OF DIGITAL IMAGES

(76) Inventors: Wilfried Donner, Kantstrasse 8, D-33615 Bielefeld (DE); Christian Wöhler, Breitenhofstrasse 22, D-89233 Neu-Ulm (DE)

(*) Notice: Subject to any disclaimer, the term of this patent is extended or adjusted under 35 U.S.C. 154(b) by 0 days.

(21) Appl. No.: 09/463,693
(22) PCT Filed: Jul. 30, 1998
(86) PCT No.: PCT/EP98/04759
§ 371 (c)(1), (2), (4) Date: Apr. 17, 2000
(87) PCT Pub. No.: WO99/06954
PCT Pub. Date: Feb. 11, 1999

(30) Foreign Application Priority Data

Jul. 30, 1997 (DE) .......................... 197 32 773

(51) Int. Cl.$^7$ .............................. G06K 9/36; H04N 1/40; G09G 5/00
(52) U.S. Cl. .................... 382/277; 382/298; 382/282; 382/255; 382/275; 358/463; 358/453; 345/616; 345/613; 345/611
(58) Field of Search ................................ 382/167, 169, 382/171, 255, 256, 274, 275, 277, 278, 280, 282, 287, 288, 289, 291, 293, 295, 298, 299, 300, 309, 310, 252, 260, 266, 269, 305; 345/20, 63, 77, 589, 604, 606, 611, 613, 616, 617, 618; 358/448, 452, 453, 461, 449, 450, 451, 463; 348/399.1, 408.1, 576, 584

(56) References Cited

U.S. PATENT DOCUMENTS

| | | | |
|---|---|---|---|
| 4,912,468 A | * | 3/1990 | Rust .......................... 341/119 |
| 4,945,502 A | | 7/1990 | Kwon et al. |
| 4,958,217 A | * | 9/1990 | Kimura et al. ................. 358/75 |
| 4,970,593 A | | 11/1990 | Cantrell |
| 5,293,312 A | * | 3/1994 | Waggener ............... 364/413.21 |
| 5,453,851 A | * | 9/1995 | Faulhaber ................... 358/481 |
| 5,684,890 A | * | 11/1997 | Miyashita et al. .......... 382/154 |

FOREIGN PATENT DOCUMENTS

WO 95/08815 3/1995

OTHER PUBLICATIONS

Wahl et al., "Digitale Bildsignalverarbeitung", Springer-Verlag, pp. 54–117, (1984).

Ohm, "Digitale Bildcodierung", Springer, pp. 31–51, (1995).

* cited by examiner

Primary Examiner—Bhavesh M. Mehta
Assistant Examiner—Yosef Kassa
(74) Attorney, Agent, or Firm—Browdy and Neimark, P.L.L.C.

(57) ABSTRACT

A method for improving the definition of a digital image whose pixels are memorized light intensity values which are arranged in rows and columns in the form of a starting matrix $A_{xy}$. A matrix section $A_{ij}$ is enlarged by reflection and subjected to a fast Fourier transform. The transformed matrix $B_{ij}$ is converted by elementary multiplication with an aberration correction matrix $C_{ij}$ to give a correct transformed matrix $B'_{ij}$. This is transformed back into an intensity matrix $A'_{ij}$ from which a core section is set to a corrected intensity matrix $A'_{xy}$. Following this, one matrix section after another is stagger-processed until a completely corrected intensity matrix $A'_{xy}$ has been obtained. The correcting function can be determined in different ways, in particular from an MFT of the imaging lens.

9 Claims, 2 Drawing Sheets

Fig. 4A — Modulation function

Fig. 5A — Correction factor

METHOD FOR IMPROVING THE DEFINITION OF DIGITAL IMAGES

BACKGROUND OF THE INVENTION

The invention relates to a method for improving the definition of a digitized image whose image elements are stored light-intensity values that are organized in rows and columns as an output matrix $A_{xy}$, with a respective matrix section $A_{ij}$ of $2^n \times 2^m$ elements being expanded, through reflection at two of its adjacent edges, and the corner formed by these edges, to $2^{n+1} \times 2^{m+1}$ elements, then subjected to a Fourier transformation. The resulting transformed matrix, $B_{ij}$, $1 \leq i \leq 2^{n+1}$, $1 \leq j \leq 2^{m+1}$, is converted through elementary multiplication with an image-aberration correction matrix $C_{ij}$ (all elements being real) into a corrected, transformed matrix $B'_{ij}$, and is transformed back into an intensity matrix $A'_{ij}$, from which a core section is set into the center of a corrected intensity matrix $A'_{xy}$, corresponding to the position of the matrix section $A_{ij}$; then, one matrix section is processed after another in this way, staggered by one edge length of the core section, until a complete, corrected intensity matrix $A'_{xy}$ is obtained.

A method of this type is known from Ohm, J. -R.:Digitale Bildcodierung [Digital Image Encoding], Springer 1995, pp. 33/34, 56/57. This processing of local matrix regions with the inclusion of a reflected environment reduces the occurrence of edge disturbances in the image regions, and effects an accelerated processing of the entire matrix.

Moreover, Wahl, F. M. discloses an image processing in the local frequency range only for locally-invariant systems in Digitale Bildsignalverarbeitung [Image Signal Processing], Springer 1984. For image-recording systems possessing locally-varying properties, such as a resolution capability that changes from location to location, local-frequency distortions of image signals are partially compensated with locally-varying filters. In these systems, the local-frequency transmission behavior is a function of the local coordinates. For each image point, therefore, a set of suitable filter coefficients would have to be determined, but to reduce costs, the locally-varying filter only comprises a few filters arranged by image regions.

It is also known to change the stored light-intensity values of the individual pixels of an image in its contrast by adding a background-brightness value and/or through the spreading or normalization of the value range; these modifications can also be implemented separately for different color-image components that are stored as separate value fields. This improves the visual appearance of an image produced with image data that have been modified in this manner; it is not possible, however, to eliminate blurring of the output image with this procedure.

SUMMARY OF THE INVENTION

It is the object of the invention to provide an effective method of improving the definition of images with regard to image aberrations of a lens.

The solution lies in suitably determining the image-aberration correction matrix according to a respective location-dependent aberration-correction matrices from an MTF, that is, modulation-transfer function correction function to match given MTF values of a lens used to image the digitized image, and selecting these local aberration-correction matrices as a subset of the image-aberration correction matrix, corresponding to the position of the associated matrix section, relative to the position of a center point of an image circle, and the distance and the tangential and radial angles of the edges of the matrix section from this central point.

The dependent claims disclose advantageous embodiments.

If the lens and the scale of the image are known, the tangential and radial frequency spread according to the position in the image circle can be taken from the MTF modulation tables of the lens. The correction factor for the individual frequencies results as the reciprocal value of the so-called modulation degree in the respective image circle, namely in the radial and tangential directions to the circle.

If the lens data or the recording data are unknown, according to an embodiment of the method, individual marked image sections are selected, and their processing parameters are varied until a desired optimum definition is achieved. The entire correction matrix can then be derived through fitting from a parametrized correction function. A tried-and-true function is described below.

The novel method operates in the frequency space, with the frequency information for processing the local values being drawn from the surroundings of a small image section. To assure a processing of the individual image sections that is untainted by marginal conditions, the segment's matrix values are reflected three times in different directions, yielding a completely-symmetrical matrix that is twice as large. The spectrum of a matrix of this type is free from marginal interferences.

The entire digital image is gradually processed in this manner, and the matrix values of the individual sections are reworked by an elementary multiplication with a local section of a correction matrix. A subset of the individual result matrix, as the core section, is then transformed back into a result matrix in the intensity range until the matrix is completely formed from these subsets. The core section used after the inverse transformation is preferably a subset corresponding to $(2^n - k_1) \times (2^m - k_2)$; $0 < k_1, k_2 < 2^{2n}$, $2^m$ elements of the original matrix section $A_{ij}$, and, accordingly, its edge lengths are $2^n - k_1$ or $2^m - k_2$, by which core sections are staggered in their arrangement. The known modifications of the elements can therefore be implemented in the amplitude space as desired.

The actual definition of the contours appears in the frequency space through processing, namely through the increase in the high frequency components to the extent that they decreased at the relevant location in the image.

In a further embodiment of the method, a correction function for the radial and tangential image components is derived from the MTF table of the lens. The associated correction function is then calculated from the radial and tangential correction-function values of the two correction functions through interpolation, with consideration of the respective position of the edge of the matrix subset relative to the image circle.

The processing time for an image is heavily dependent on the size of the selected matrix sections. On the other hand, the larger the section, the greater the attainable improvement in definition, although a considerable enlargement does not yield much improvement. In contrast, if the number of matrix elements is too low, the statistical noise is amplified, so raised "seeds and salt" appear on a matte surface: For example, the grain of a reproduced photo or the sieve structure of a reproduced print disadvantageously appears. An image section of 8×8 or 16×16 elements, with a core of 4×4 or 8×8 sharpened elements ultimately being used, has proven advantageous in practice.

Because the image edge of the selected core regions, which are smaller than the sections, does not extend to the original image edge, the inverse-transformed image-element values remaining there after the core has been extracted can be used to fill the edge region. As an alternative, one or more rows of the original matrix elements can be reflected around the image edge prior to the transformation, which creates a slightly larger output matrix, so the core regions arranged together cover the entire original matrix size, and the reflected edge region is omitted and not filled.

In a modification of the method, in the case of a plurality of image-value matrices that are divided by color, they are separated and, provided that they are known, they are corrected with the correction function specified for the respective color. Moreover, the individual color-image matrices are advantageously converted into a matching format through a radial expansion or compression in the image circle; the different imaging scales of the lens are compensated for the individual colors. This process eliminates unattractive color fringes along the sharply-defined edges.

If the color aberrations are not known to the device, they can be determined through an analysis of color-intensity value courses for selected image sections, particularly those containing the edges that are tangential to the image circle, in that the relative displacements of the transitions of the edges that have been sharpened through processing are determined in the individual color-image matrices, and the degree of the expansion or compression to which the respective result matrix is then subjected is determined from the displacements in relation to their position in the image circle.

Thus, the method and its embodiments can be employed following digitizing to correct images that have been recorded with unknown lenses and with blurring, with respect to different types of imaging errors, especially relative to their definition and color aberrations.

A correction function that is suitable for the entire image can be determined through a sectional processing by means of a step-wise approximation, or from the MTF characteristic values of the lens and the imaging parameters, provided that they are known. Factors to be considered here are, for example, the location in the image circle, that is, the distance of the element in the image plane from the optical axis of the imaging lens, the direction radially or tangentially or at an angle to the image circle of the image elements or matrix elements, the opening ratio, the inclination of the image plane relative to the lens plane and, if applicable, the color.

The method is illustrated by FIGS. 1 through 5.

BRIEF DESCRIPTION OF THE DRAWINGS

FIGS. 4A and 4B show functions from FIG. 3.

FIGS. 5A and 5B show associated correction functions.

DETAILED DESCRIPTION OF THE DRAWINGS

Figure 1:
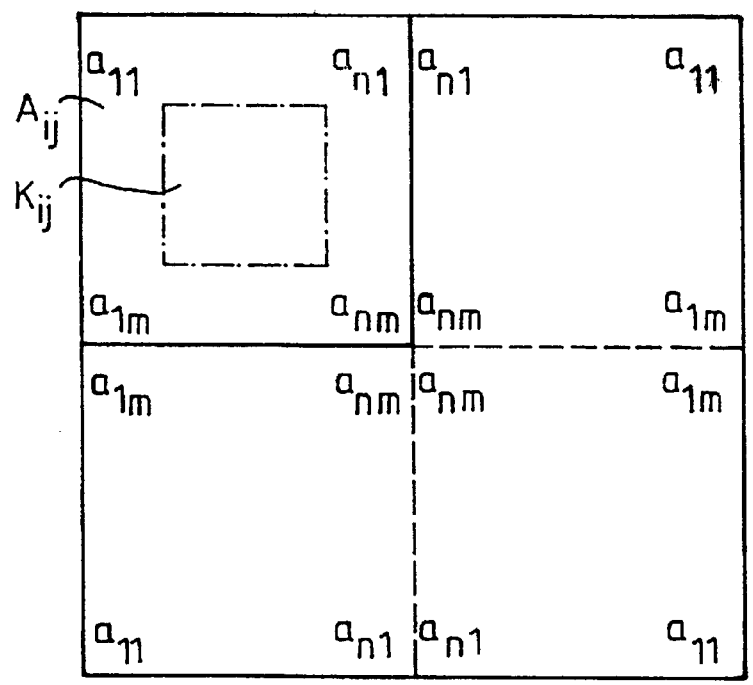
FIG. 1 shows the matrix section in reflected form.
Figure 2:
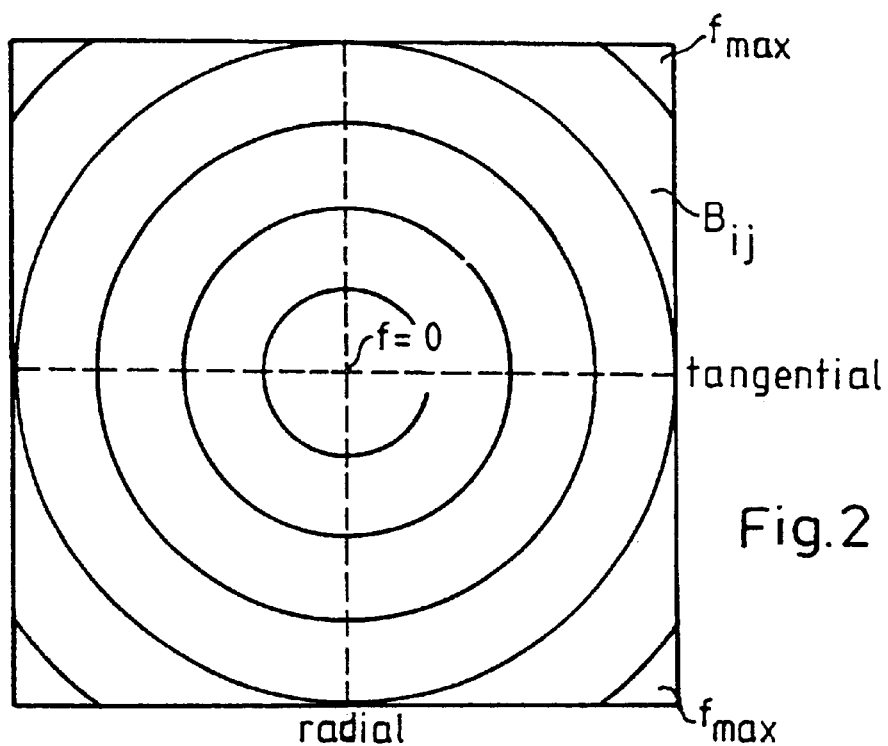
FIG. 2 shows the structure of the transformed matrix section.

A data field of digitized brightness values or color-intensity values forming an output matrix $A_{xy}$ constitutes the output data. A subset $A_{ij}$, $1 \leq i \leq 2^n$, $1 \leq j \leq 2^m$ is derived from this matrix, where n and m are preferably 3 or 4, and are generally of equal value, so the subset includes 8×8 or 16×16 elements. According to FIG. 1, the matrix completed in this manner is reflected via two colliding edges and the impact corner, so each element is present four times; the corner elements are represented as $a_{11}$, $a_{1m}$, $a_{n1}$, $a_{nm}$.

In the first method step, the Fourier transform $B_{ij}$, which also comprises $2^{n+1} \times 2^{m+1}$ elements, is formed for these anticipated matrices. The intensity distributions of the local frequencies f in the tangential and radial directions, and in the interposed directions, are represented in the lines or columns of the matrix; the local frequency f is zero in the center, and the maximum local frequency fmax is present in the matrix corners.

The transform $B_{ij}$ formed in this way is now multiplied in elementary fashion by a local correction matrix $C_{ij}$, producing the corrected, transformed matrix $B'_{ij}$.

Figure 3:
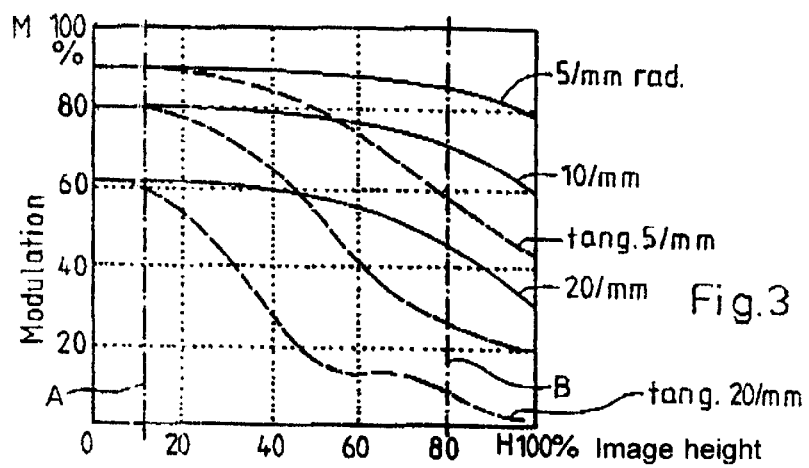
FIG. 3 shows an MTF function of a lens.

In the example according to FIG. 3, the MTF of a lens is known for the image that has been digitized. The relative modulation depends on the relative image height in the image circle, with the line densities that represent the frequency having the parameters 5/mm, 10/mm and 20/mm, separately for the radial and tangential directions; the latter are shown in dashed lines.

Figure 4B:
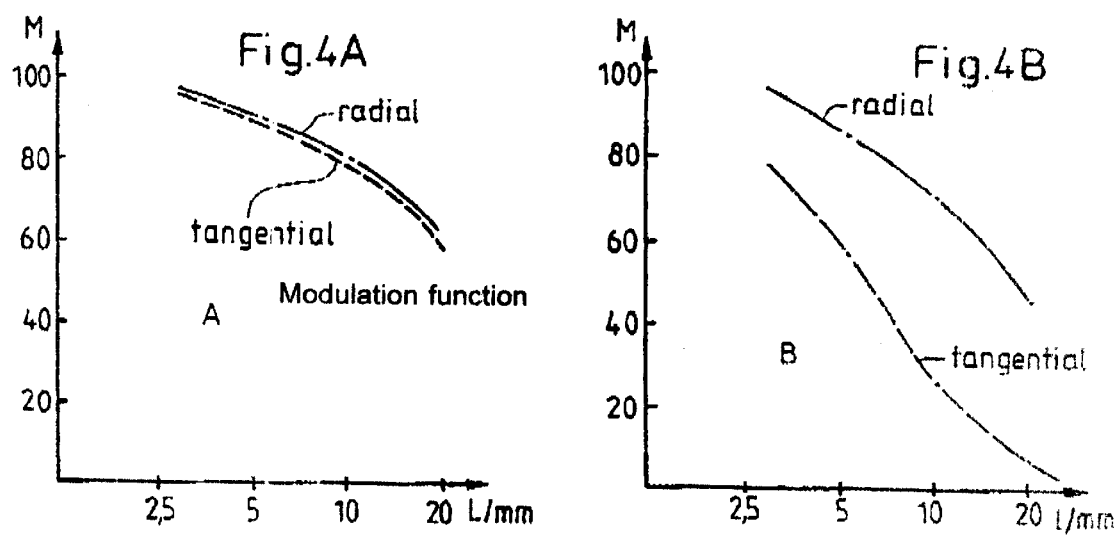

FIGS. 4A and 4b illustrate the modulation functions in solid lines over the line density, for the example of image heights of 10% or 80%.

Figure 5B:
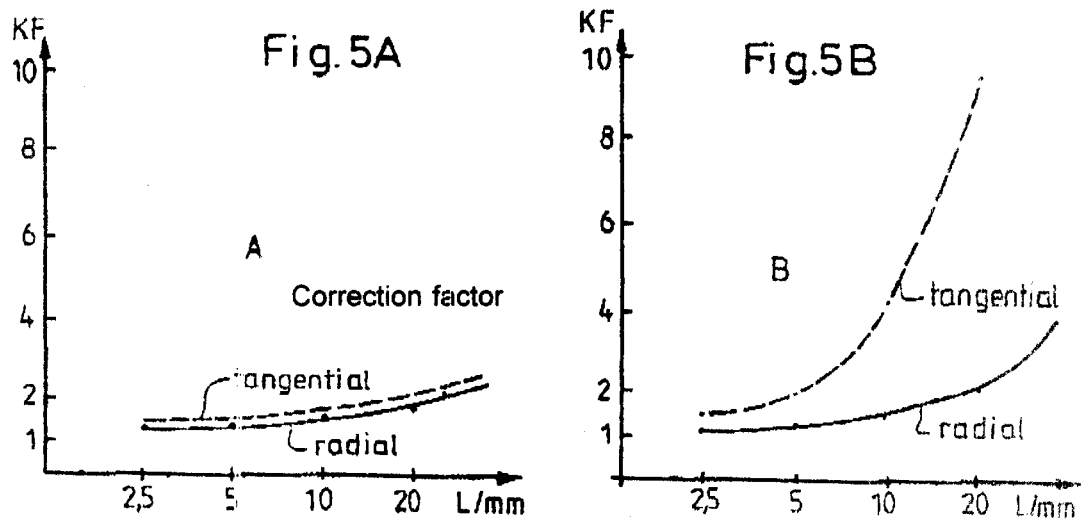

FIGS. 5A and 5B respectively show the correction functions matching the illustrated modulation functions. The correction factors are inverse to the modulation. This example shows how the correction factors that ultimately constitute the total correction matrix are to be determined from the information in FIG. 3 through a suitable selection of a functional interpolation for all image regions.

The inverse transformation of the corrected matrix $B'_{ij}$ into the amplitude space yields the corrected matrix $A'_{ij}$, in which a core region $K_{ij}$ is respectively extracted from one of the quadrants, the region typically being smaller than the quadrant, and preferably containing $2^n - k_1 \times 2^m - k_2$ elements, where $0 < k_1, k_2 < 2^n, 2^n$. Preferably, $k_1, k_2 = 1$ is selected.

The image-aberration correction matrix $C_{xy}$ is determined, for example, from an MTF correction function of a lens used to image the digitized image, and the local image-aberration correction matrices $C_{ij}$ are selected as a subset of the correction matrix, corresponding to the position of the associated matrix section $A_{ij}$ relative to the position of a central point of the image circle, and the distance and the tangential and radial angles of the edges of the matrix section with respect to this point.

In a variation of the method, the MTF correction function of a lens is determined empirically according to the statement $c(f) = 1 + af^b$; a, b>0, where f is the local frequency and a and b are parameters that are fitted to given MTF values of a lens type, an aperture setting, a distance from the center point of the image circle and the tangential and radial directions; the corrected amplitude Acorr(f) of a particular local frequency f is determined from the original amplitude Ao(f) through multiplication with the correction function c(f).

In a preferred variation of the method, the MTF correction function c(f) is determined with radial parameters $a_r$, $b_r$ and tangential parameters $a_t$, $b_t$ from associated variables of the lens for a matrix-edge direction z, which forms an angle $\beta$ with the tangential direction t, the correction function being dependent on the local frequency f and the angle $\beta$ according to $c(f, \beta) = c_t(f) + (c_r(f) - c_t(f)) \cdot \sin^2 \beta$ as the sum of the tangential correction-function value $c_t(f)$ and the product of the difference between the radial and tangential correction-function values $c_r(f)$, $c_t(f)$ and the square of the sine of the angle β, resulting in the angle-corrected amplitude Acorr(f, β)=Ao(f, β)·c(f, β) through multiplication of the original amplitude Ao(f, β) with the correction function c(f, β).

In a further variation of the method, the MTF correction function is determined according to the statement k(f)=(1+af)$^v$; a, v>0, where f is the local frequency and the parameters a and v are determined through fitting to the MTF values of a predetermined lens, or are optimized in steps as freely-selected values.

In color images whose digitized image elements are determined through a plurality of output matrices $A_{xy}$ of different color-intensity values, the matrices are preferably corrected separately according to the correction functions associated with the individual colors.

The corrected color-intensity value matrices $A'_{xy}$ are then advantageously subjected to a corrective radial expansion or compression with respect to a center point of an image circle, corresponding to different color-imaging scales. In the process, according to the degree of overlapping of the pixels of the target image field with the pixels of the source image field, the intensity values of the individual, associated matrix elements are added to the new matrix elements of the target image field.

If the color-image aberrations of the lens with which the image was first produced are unknown, the different color-image scales from partial regions of the corrected matrices $A'_{xy}$ are determined through the determination of the deviation of the radial positions from jumps in color intensity in the different color matrices, which represent tangential edges, relative to one another and to the distance of the studied partial region from the center point of the image circle.

Not only in cases in which the lens MTF data and the recorded data are known individually can the image definition be corrected; an arbitrary blurry image can also be corrected later, even if the image was recorded with poor definition due to defocussing or wobbling, or contained color aberrations, in that the correction function is determined with a parameter optimization, particularly through a processing of small image sections and the assessment of these sections; this assessment is performed by a subjective observer or automatically through a step-wise maximizing of a definition criterion. The conventional electronic or photographic devices for weighting color, changing contrast and influencing the background brightness are independent of the assessment, and are preferably to be implemented in advance.

What is claimed is:

1. A method for improving the definition of a digitized image whose image elements are stored light-intensity values that are organized in rows and columns as an output matrix $A_{xy}$, with a respective matrix section $A_{ij}$ of $2^n \times 2^m$ elements, the respective matrix section $A_{ij}$ having a position and being expanded, through reflection at two of its adjacent edges, and a corner formed by these edges, to $2^{n+1} \times 2^{m+1}$ elements, then subjected to a Fourier transformation, to form a transformed matrix, $B_{ij}$, $1 \leq i \leq 2^{n+1}$, $1 \leq j \leq 2^{m+1}$, the transformed matrix being converted through elementary multiplication with an image-aberration correction matrix $C_{ij}$ (all elements being real) into a corrected, transformed matrix $B'_{ij}$, and transformed back into an intensity matrix $A'_{ij}$, from which a core section is set into the center of a corrected intensity matrix $A'_{xy}$, corresponding to the position of the matrix section $A_{ij}$, and one matrix section is processed after another in this way, staggered by one edge length of the core section, until a complete, corrected intensity matrix $A'_{xy}$ is obtained, characterized in that the image-aberration correction matrix is determined as a function of location in that a location-dependent aberration-correction matrix from an MTF correction function are determined to match given MTF values of a lens used to image the digitized image, and these local aberration-correction matrices are selected as a subset of the aberration-correction matrix, corresponding to the position of an associated matrix section, relative to the position of a center point of an image circle, and the distance and the tangential and radial angles of the edges of the matrix section from this center point.

2. The method according to claim 1, characterized in that the core section corresponds to a subset of $(2^n-k_1) \times (2^m-k_2)$; $0 \leq k_1$, $k_2 \leq 2^{2n}$, $2^m$ elements of the original matrix section $A_{ij}$, and the core sections are assembled, staggered by one edge length of $2^n-k_1$ or $2^m-k_2$.

3. The method according to one of the foregoing claims, characterized in that the core region has $2^{n-1} \times 2^{m-1}$ elements.

4. The method according to claim 1, characterized in that the MTF correction function of a lens is determined empirically according to the statement c(f)=1+af$^b$; a, b≦0, where f is the local frequency and a and b are parameters that are fitted to given MTF values of a lens type, an aperture setting, a distance from the center point of the image circle and the tangential and radial directions; the corrected amplitude Acorr(f) of a particular local frequency f is determined from the original amplitude Ao(f) through multiplication with the correction function c(f).

5. The method according to claim 4, characterized in that the MTF correction function c(f) is determined with radial parameters $a_r$, $b_r$ and tangential parameters $a_t$, $b_t$ from associated variables of the lens for a matrix-edge direction z, which forms an angle β with the tangential direction t, the correction function being dependent on the local frequency f and the angle β according to c(f, β)=$c_t$(f)+($c_r$(f)−$c_t$(f))·sin$^2$ β as the sum of the tangential correction-function value $c_t$(f) and the product of the difference between the radial and tangential correction-function values $c_r$(f), $c_t$(f)) and the square of the sine of the angle β, resulting in the angle-corrected amplitude Acorr(f, β)=Ao(f, β)·c(f, β) through multiplication of the original amplitude Ao(f, β) with the correction function c(f, β).

6. The method according to claim 1, characterized in that the MTF correction function is determined according to the statement k(f)=(1+af)$^v$; a, v>0, where f is the local frequency and the parameters a and v are determined through fitting to the MTF values of a predetermined lens, or are optimized in steps as freely-selected values.

7. The method according to one of the foregoing claims, characterized in that the digitized image elements are determined through a plurality of output matrices $A_{xy}$ of different color-intensity values, and matrices are preferably corrected separately according to the correction functions associated with the individual colors.

8. The method according to claim 7, characterized in that the corrected color-intensity value matrices $A'_{xy}$ are subjected to a corrective radial expansion or compression with respect to a center point of an image circle, corresponding to different color-imaging scales.

9. The method according to claim 8, characterized in that the different color-image scales from partial regions of the corrected matrices $A'_{xy}$ are determined through the determination of the deviation of the radial positions from jumps in color intensity in the different color matrices, which represent tangential edges, relative to one another and to the distance of the studied partial region from the center point of the image circle.

* * * * *